(12) United States Patent
Chu et al.

(10) Patent No.: US 7,725,337 B2
(45) Date of Patent: May 25, 2010

(54) QUANTIFYING REVENUE AND PROFIT IMPACT OF RETIMING FLIGHTS WHILE TAKING INTO CONSIDERATION NON-LINEAR RAMIFICATIONS AND CONSTRAINTS

(75) Inventors: Ronald Wai Yin Chu, Coppell, TX (US); Su-Hsia Yang, Irving, TX (US); Tze-Yun Lin, Irving, TX (US); Atul Jain, Flower Mound, TX (US)

(73) Assignee: American Airlines, Inc., Fort Worth, TX (US)

( * ) Notice: Subject to any disclaimer, the term of this patent is extended or adjusted under 35 U.S.C. 154(b) by 374 days.

(21) Appl. No.: 11/955,797

(22) Filed: Dec. 13, 2007

(65) Prior Publication Data

US 2009/0157438 A1 Jun. 18, 2009

(51) Int. Cl.
*G06Q 10/00* (2006.01)
*G01C 21/34* (2006.01)
*G06F 17/30* (2006.01)
(52) U.S. Cl. .................... 705/5; 705/6; 705/10; 705/28
(58) Field of Classification Search ................. 705/5–6, 705/10, 28
See application file for complete search history.

(56) References Cited

U.S. PATENT DOCUMENTS

| 6,314,361 | B1 | 11/2001 | Yu et al. | 701/120 |
|---|---|---|---|---|
| 6,711,548 | B1 | 3/2004 | Rosenblatt | 705/6 |
| 7,418,409 | B1 * | 8/2008 | Goel | 705/26 |
| 7,617,136 | B1 * | 11/2009 | Lessing et al. | 705/28 |
| 2003/0225600 | A1 * | 12/2003 | Slivka et al. | 705/5 |
| 2004/0039613 | A1 * | 2/2004 | Maycotte et al. | 705/5 |
| 2007/0203762 | A1 * | 8/2007 | Cutler et al. | 705/5 |
| 2009/0106083 | A1 * | 4/2009 | Parker et al. | 705/10 |

FOREIGN PATENT DOCUMENTS

FR 2782814 A1 * 3/2000

OTHER PUBLICATIONS

Fodness, Dale et al., "Passenger's Expectations of Airport Service Quality", 2007, Journal of Services Marketing, V.21 N. 7, pp. 492-506.*

* cited by examiner

*Primary Examiner*—John W Hayes
*Assistant Examiner*—Fadey S Jabr
(74) *Attorney, Agent, or Firm*—Robert A. Voigt, Jr.; Winstead P.C.

(57) ABSTRACT

A method, system and computer program product for efficiently quantifying the economic impact of retiming flights without the necessity of implementing the traditional airline forecasting system from scratch. A forecast module computes the difference in impact prior to and after the retiming of a flight. A flight grouping module, using the computed difference in impact, generates a new schedule, which is used by the forecast module to generate new changes in impact, until the schedule converges. A flyable module generates a list of retimed flights based on the converged schedule for resolving operational infeasibilities of the latter. The forecast module generates a profit for each of the retimed flights, which is used by a scheduling module to improve the schedule, which is used by the forecast module to revise the economic impacts for the list of all retimed flights. This process continues until no further economic improvement can be made.

24 Claims, 8 Drawing Sheets

QUANTIFYING REVENUE AND PROFIT IMPACT OF RETIMING FLIGHTS WHILE TAKING INTO CONSIDERATION NON-LINEAR RAMIFICATIONS AND CONSTRAINTS

TECHNICAL FIELD

The present invention relates to airplane flight scheduling, and more particularly to quantifying the revenue and profit impact of retiming flights while taking into consideration the non-linear ramifications and constraints.

BACKGROUND INFORMATION

In the past, the scheduling of airplane flights was performed manually. It was assumed that this manual process in scheduling airplane flights optimized the amount of profits to be earned by the airline. If a flight was retimed, then it was assumed that there was a negative impact on the airline's profits. That is, if a flight changed the origin-departure time (i.e., changed the time it left the place of origin and the time it arrived at the place of destination), then it was assumed that there was a negative impact on the airline's profits.

However, there was no consideration of new opportunities that may be gained by retiming flights. For example, if a flight from Dallas to Austin originally left Dallas at 13:00 and was retimed to leave Dallas at 13:20, then there may be new opportunities gained by allowing additional flights to connect in Dallas to fly to Austin. For instance, if a flight from San Diego to Dallas arrived in Dallas at 12:45, then those passengers would not originally be able to make a connecting flight to Austin in Dallas at 13:00. If, however, the flight from Dallas to Austin was retimed to leave Dallas at 13:20, then those passengers on the flight from San Diego to Dallas would now be able to make the connecting flight to Austin in Dallas. Hence, additional revenue may be generated for the airline.

Further, there was no quantification of lost opportunities. For example, if a particular flight was retimed an hour later which caused a passenger to wait an additional hour for that connecting flight, then that passenger may seek out a flight from a different airline as the passenger may be averse to waiting such a long time for the connecting flight. Further, the retiming of a flight may cause a "break" in the connection. "Breaking a connection" may refer to changing the flight time in such a manner as to make that flight no longer connectable for an incoming flight. For example, suppose that the flight from Dallas to Austin originally left Dallas at 13:00 and was retimed to leave Dallas at 12:40. If a flight from San Diego to Dallas arrives in Dallas at 12:30, then those passengers no longer could make the connecting flight to Austin in Dallas at 12:40. Hence, the connection to Austin at Dallas is broken for these passengers.

There have been attempts in quantifying the impact of retiming flights; however, none have been successful, in part due to the non-linearity and discreteness of the solution as well as in part due to the lack of computation efficiency. Each time a flight is retimed, it impacts other flights, such as whether new connections may be made or whether existing connections become broken. Further, passengers' demand for the retimed flight may change. Passengers' demand may refer to the desire a passenger has in taking that flight. Moreover, the schedules of all competing airlines should be considered. Additionally, it may not be feasible for the flight to leave at that time due to slot constraints of the airport. For example, the airport may only have the capacity to allow a limited number of airplanes to leave the airport at around the same time. Hence, there needs to be a consideration of the number of flights to be flown by other airlines. Further, it may not be feasible for the flight to leave at a particular time due to operating constraints of the focus airline. For example, a flight may not be able to be retimed due to gate availability of the focus airline.

If, however, the revenue impact of retiming flights could be quantified taking into consideration the various ramifications as discussed above (e.g., impact on other flights, change in passengers' demand, airport constraints), then airlines could generate a schedule that would maximizing their revenue while taking into consideration the various non-linear ramifications and constraints.

Therefore, there is a need in the art to quantify the revenue and profit impact of retiming flights taking into consideration the various non-linear ramifications and constraints.

SUMMARY

The problems outlined above may at least in part be solved in some embodiments by having a module ("forecast module") use an iterative process to compute the difference in total demand revenue prior to the retiming of the flight and after the retiming of the flight. The difference in total demand revenue is used by a module ("flight grouping module") to generate a new schedule (i.e., a new retimed flight) which is used by the forecast module to compute another change in the total demand revenue. Once the flight grouping module generates a schedule that converges to a particular schedule, a module ("flyable module") generates a list of retimed candidates (retimed flights) based on the converged schedule since the converged schedule may be an un-flyable schedule. The forecast module may then generate a profit for each of the retimed flights which is transmitted to a scheduling module. The scheduling module selects a schedule that maximizes the profit based on the feasibility of implementing such a schedule. If the selected schedule is not a converged schedule, then the process of the forecast module generating a profit for each of the retimed flights (for the schedule selected by the scheduling module) is repeated until the scheduling module generates a converged schedule. Once the schedule produced by the scheduling module converges to a particular schedule, the particular schedule should correspond to the schedule that maximizes profit while taking into consideration operational constraints. In this manner, the revenue and profit impact of retiming flights is quantified while taking into consideration the various non-linear ramifications and constraints.

In one embodiment of the present invention, a method for quantifying the revenue and profit impact of retiming flights comprises the step of receiving a flight schedule for a plurality of airlines. The method further comprises receiving a new departure time and a new arrival time for a retimed flight. Further, the method comprises determining a set of existing origin-destination itineraries that can still be served by the retimed flight. Additionally, the method comprises determining a set of existing origin-destination itineraries that can no longer be served by the retimed flight. Furthermore, the method comprises determining a set of new origin-destination itineraries that can now be served by the retimed flight. In addition, the method comprises computing a total demand revenue in each active origin-destination market without the retimed flight, where the active origin-destination market corresponds to the set of existing origin-destination itineraries that can still be served by the retimed flight, the set of existing origin-destination itineraries that cannot be served by the retimed flight, and the set of new origin-destination itineraries that can now be served by the retimed flight. Further, the method comprises re-computing a quality of service value for itineraries that can be served by the retimed flight, where the quality of service value corresponds to a value proportional to a quality of service of a flight from a passenger's perspective. Additionally, the method comprises discarding itineraries corresponding to quality of service values below a threshold. Further, the method comprises storing itineraries corresponding to quality of service values above the threshold, where the stored itineraries form a new set of origin-destination itineraries using the retimed flight. In addition, the method comprises computing a total demand revenue using the new set of origin-destination itineraries using the retimed flight. Furthermore, the method comprises computing a difference between the computed total demand revenue in each active origin-destination market without the retimed flight and the computed total demand revenue using the new set of origin-destination itineraries using the retimed flight.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for quantifying the revenue and profit impact of retiming flights. In one embodiment of the present invention, a module ("forecast module") uses an iterative process to compute the difference in total demand revenue prior to the retiming of the flight and after the retiming of the flight. The difference in total demand revenue is used by a module ("flight grouping module") to generate a new schedule (i.e., a new retimed flight) which is used by the forecast module to compute another change in the total demand revenue. Once the flight grouping module generates a schedule that converges to a particular schedule, a module ("flyable module") generates a list of retimed candidates (retimed flights) based on the converged schedule since the converged scheduled may be an un-flyable schedule. The forecast module may then generate a profit for each of the retimed flights which is transmitted to a scheduling module. The scheduling module selects a schedule that maximizes the profit based on the feasibility of implementing such a schedule. If the selected schedule is not a converged schedule, then the process of the forecast module generating a profit for each of the retimed flights (for the schedule selected by the scheduling module) is repeated until the scheduling module generates a converged schedule. Once the schedule produced by the scheduling module converges to a particular schedule, the particular schedule should correspond to the schedule that maximizes profit while taking into consideration operational constraints. In this manner, the revenue impact of retiming flights is quantified while taking into consideration the various non-linear ramifications and constraints.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
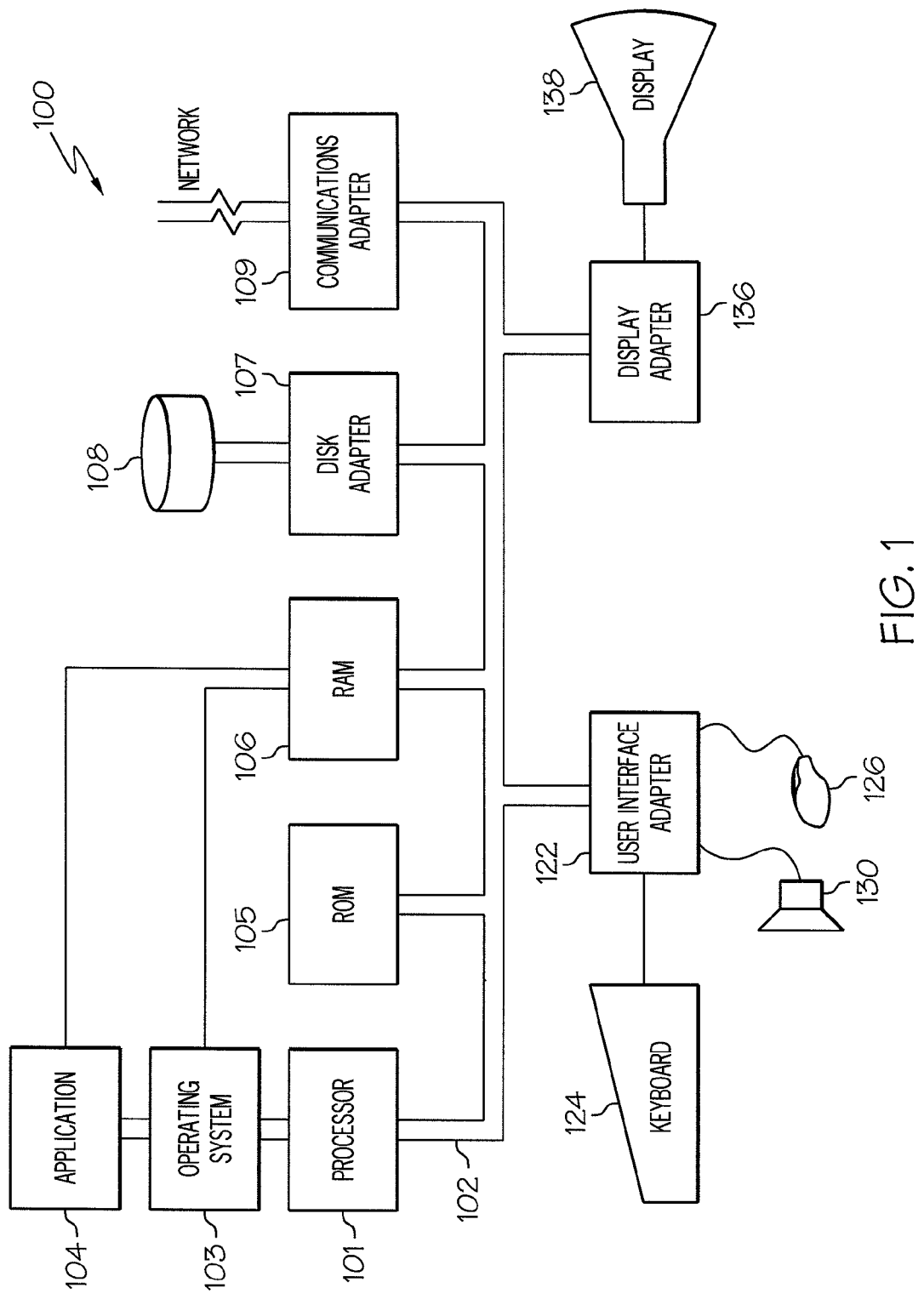
FIG. 1 illustrates a computer system in accordance with an embodiment of the present invention.

FIG. 1—Computer System

FIG. 1 illustrates an embodiment of a hardware configuration of a computer system 100 (FIG. 1) which is representative of a hardware environment for practicing the present invention. Computer system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a software module referred to herein as the "forecast module," used for quantifying the revenue impact of retiming flights while taking into consideration the non-linear ramifications and constraints as discussed further below in association with FIGS. 3A-E and FIGS. 4A-B.

Referring to FIG. 1, Read-Only Memory (ROM) 105 may be coupled to system bus 102 and include a basic input/output system ("BIOS") that controls certain basic functions of computer system 100. Random access memory (RAM) 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program of the present invention used for quantifying the revenue impact of retiming flights while taking into consideration the non-linear ramifications and constraints, as discussed further below in association with FIGS. 3A-E and FIGS. 4A-B, may reside in disk unit 108 or in application 104.

Referring to FIG. 1, computer system 100 may further include a communications adapter 109 coupled to bus 102. Communications adapter 109 may interconnect bus 102 with an outside network (not shown) enabling computer system 100 to communicate with other such devices.

I/O devices may also be connected to computer system 100 via a user interface adapter 122 and a display adapter 136. Keyboard 124, mouse 126 and speaker 130 may all be interconnected to bus 102 through user interface adapter 122. Data may be inputted to computer system 100 through any of these devices. A display monitor 138 may be connected to system bus 102 by display adapter 136. In this manner, a user is capable of inputting to computer system 100 through keyboard 124 or mouse 126 and receiving output from computer system 100 via display 138 or speaker 130.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, and optical data storage devices. The computer readable medium can also be distributed over network-coupled computer systems so that the computer readable code is stored and executed in a distributed fashion.

As stated in the Background Information section, there have been attempts in quantifying the impact of retiming flights; however, none have been successful, in large part due to the non-linear solutions that are required. Each time a flight is retimed, it impacts other flights, such as whether new connections may be made or whether existing connections become broken. Further, passengers' demand for the retimed flight may change. Passengers' demand may refer to the desire a passenger has in taking that flight. Additionally, it may not be feasible for the flight to leave at that time due to the constraints of the airport. For example, the airport may only have the capacity to allow a limited number of airplanes to leave the airport at around the same time. Hence, there needs to be a consideration of the number of flights to be flown by other airlines. If, however, the revenue impact of retiming flights could be quantified taking into consideration the various ramifications as discussed above (e.g., impact on other flights, change in passengers' demand, airport constraints), then airlines could generate a schedule that would maximizing their revenue while taking into consideration the various non-linear ramifications and constraints. Therefore, there is a need in the art to quantify the revenue impact of retiming flights taking into consideration the various non-linear ramifications and constraints.

Figure 2:
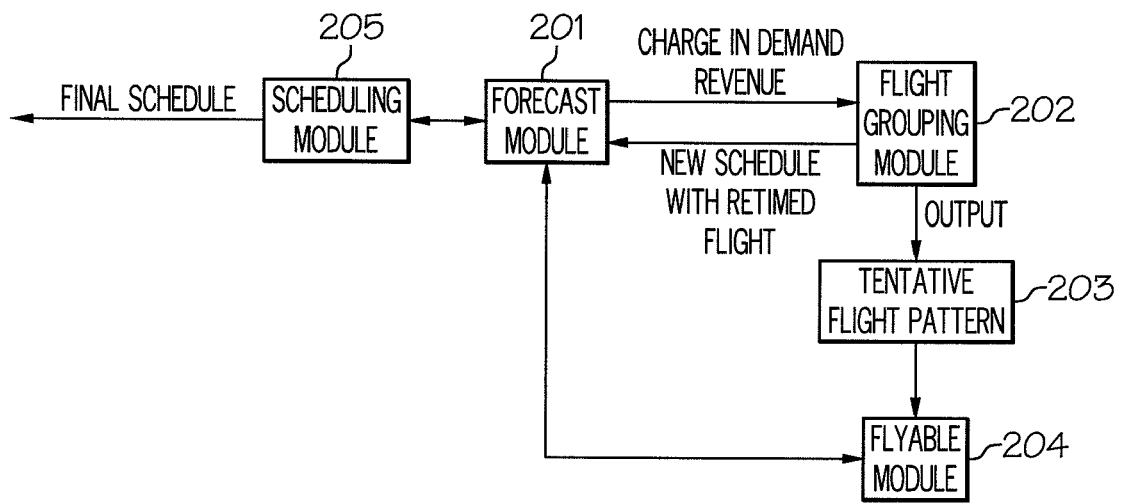
FIG. 2 is a diagram illustrating the software components used in quantifying the revenue impact of retiming flights taking into consideration the various non-linear ramifications and constraints in accordance with an embodiment of the present invention.

The revenue impact of retiming flights may be quantified by the "forecast module" taking into consideration the various non-linear ramifications and constraints as discussed below in connection with FIGS. 2, 3A-E and 4A-B. FIG. 2 is a diagram illustrating the software modules used in quantifying the revenue impact of retiming flights taking into consideration the various non-linear ramifications and constraints. FIGS. 3A-E are a flowchart of a method for quantifying the revenue impact of retiming flights. FIGS. 4A-B are a flowchart of a method for producing a schedule that maximizes revenue while taking into consideration the feasibility of having such a schedule.

FIG. 2—Software Modules Used in Quantifying Revenue Impact of Retiming Flights

FIG. 2 is a diagram illustrating the software components used in quantifying the revenue impact of retiming flights taking into consideration the various non-linear ramifications and constraints in accordance with an embodiment of the present invention.

Referring to FIG. 2, a software module, referred to herein as the "forecast module" 201, is configured to generate the change in demand revenue (discussed further below) as a result of retiming a flight as well as configured to generate a profit of the retimed flight. The generation of the change in demand revenue as well as the generation of the profit of the retimed flight is discussed further below in association with FIGS. 3A-E. As discussed above, in one embodiment, forecast module 201 may reside in application 104 (FIG. 1) or in disk 108.

The change in demand revenue, generated by forecast module 201, is transmitted to a software module referred to herein as the "flight grouping module" 202. Flight grouping module 202 is configured to provide forecast module 201 with a new schedule taking into consideration the opportunities given by the retimed flights. Forecast module 201 repeats the process (discussed below in association with FIGS. 3A-E) in generating a changed in demand revenue based on retiming a flight which is then transmitted to flight grouping module 202. This process continues until the convergence of a tentative flight pattern 203. It is noted that flight grouping module 202 may reside in either application 104 or disk 108 or may reside in a separate computer system coupled to computer system 100.

As discussed above, flight grouping module 202 generates a schedule taking into consideration all available retimed flights and their impact on demand revenue or profit as computed in forecast module 201. Once the schedule generated by flight grouping module 202 converges to a single schedule ("tentative flight pattern 203"), flight grouping module 202 outputs tentative flight pattern 203 to a software module, referred to herein as the "flyable module" 204. Tentative flight pattern 203 may be an un-flyable schedule. That is, the schedule of tentative flight pattern 203 may contain flights that violate some operational constraints. For example, tentative flight pattern 203 may include too many flights departing at the same time thereby exceeding the airport's capacity, or that the number of aircraft used is not correct due to various operational rules to connect flights at the arrival airport, or that the number of gates used exceeds the airline's inventory. As a result, flyable module 204 generates a list of retimed flights for each flight in tentative flight pattern 203. That is, flyable module 204 generates a list of retimed flights (e.g., 12:50, 12:55, 13:05, 13:10) for each flight in the tentative flying pattern (e.g., particular flight segment from Dallas to Austin that was schedule to leave at 13:00). The list of retimed flights is provided to forecast module 201 to generate a profit for each of the retimed flights. It is noted that flyable module 204 may reside in either application 104 or disk 108 or may reside in a separate computer system coupled to computer system 100.

As stated above, flyable module 204 provides a list of retimed flights for each flight in the tentative flying pattern to forecast module 201 to compute a profit for each of the retimed flights. Upon forecast module 201 generating a profit for each of the retimed flights (discussed further below in connection with FIGS. 3A-E), forecast module 201 outputs the profit for each of the retimed flights to a module, referred to herein as the "scheduling module 205." Scheduling module 205 is configured to select a set of retimed flights to form a schedule that maximizes the profit based on the feasibility of implementing such a schedule. Once schedule module 205 finds such a schedule, one "iteration" between forecast module 201 and scheduling module 205 is completed. The schedule selected by module 205 satisfies the operational constraints and is therefore feasible or flyable. Operational constraints may include, for example, the number and type of aircraft that can park at a gate at a specific time. It is noted that scheduling module 205 may reside in a separate computer system coupled to computer system 100.

The flyable schedule selected by scheduling module 205 can be further improved. Improvements can be made because at the time schedule module 205 picks a set of retimed flights to form a flyable pattern, the economic value of each retimed flight is computed (by forecast module 201) based on the assumption that no other flight in the system is retimed. This may not be the case as typically more than one retimed flight is selected, and each retimed flight may have an impact on the economic performance of the other flights. To rectify this non-linearity, the selected schedule by scheduling module 205 is re-submitted to forecast module 201 to re-compute the new economic value of each retimed flight, i.e., initiate another "iteration." Under most situations, the same set of retimed flights generated by flyable module 204 in the previous "iteration" can be used as the input to forecast module 201 for the new "iteration." If it is needed, flyable module 204 may generate a new set of retimed flights for the new "iteration." This iterative process can be repeated until there is no significant difference between the profitability of the schedule generated by scheduling module 205 in the current iteration and the profitability of the schedule generated by scheduling module 205 in the previous iteration. In this manner, the iterative process converges to an optimal solution taking into account all non-linear interactions among retimed flights and also the operational constraints faced by the airline. A discussion of how forecast module 201 computes the economic impact of a retimed flight is provided further below in connection with FIGS. 3A-E.

Scheduling module 205 selects another schedule that maximizes the profit based on the feasibility of implementing such a schedule. The process described above continues until the schedule selected by scheduling module 205 converges to a single schedule, which is the schedule to be implemented by the airline.

As discussed above, forecast module 201 quantifies the revenue impact of retiming flights based on various non-linear ramifications and constraints. A description of forecast module 301 quantifying the revenue impact of retiming flights is discussed below in association with FIGS. 3A-E.

FIGS. 3A-E—Method for Quantifying the Revenue Impact of Retiming Flights

FIGS. 3A-E are a flowchart of a method 300 for quantifying the revenue impact of retiming flights taking into consideration the various non-linear ramifications and constraints in accordance with an embodiment of the present invention.

Figure 3A:
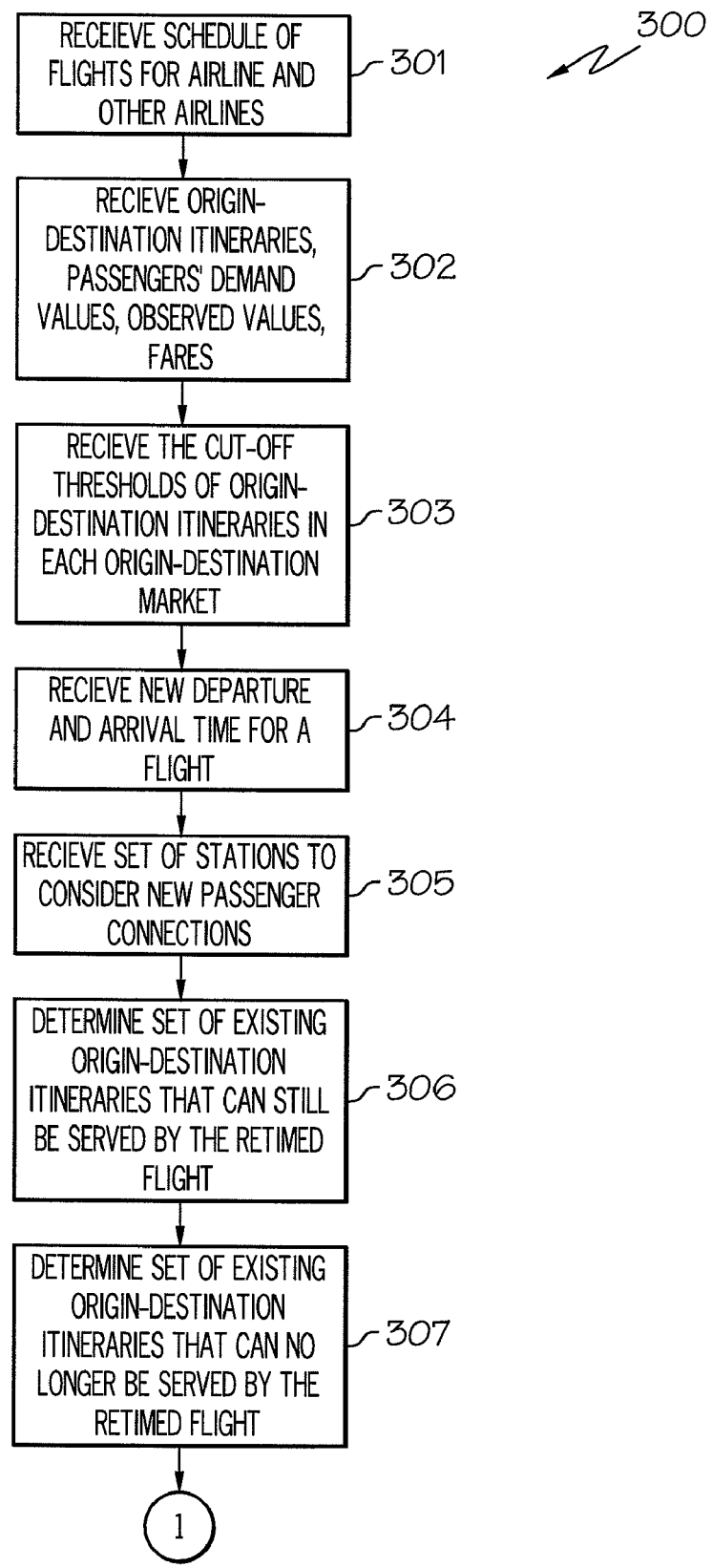
FIGS. 3A-E are a flowchart of a method for quantifying the revenue impact of retiming flights taking into consideration the various non-linear ramifications and constraints in accordance with an embodiment of the present invention.
Figure 4A:
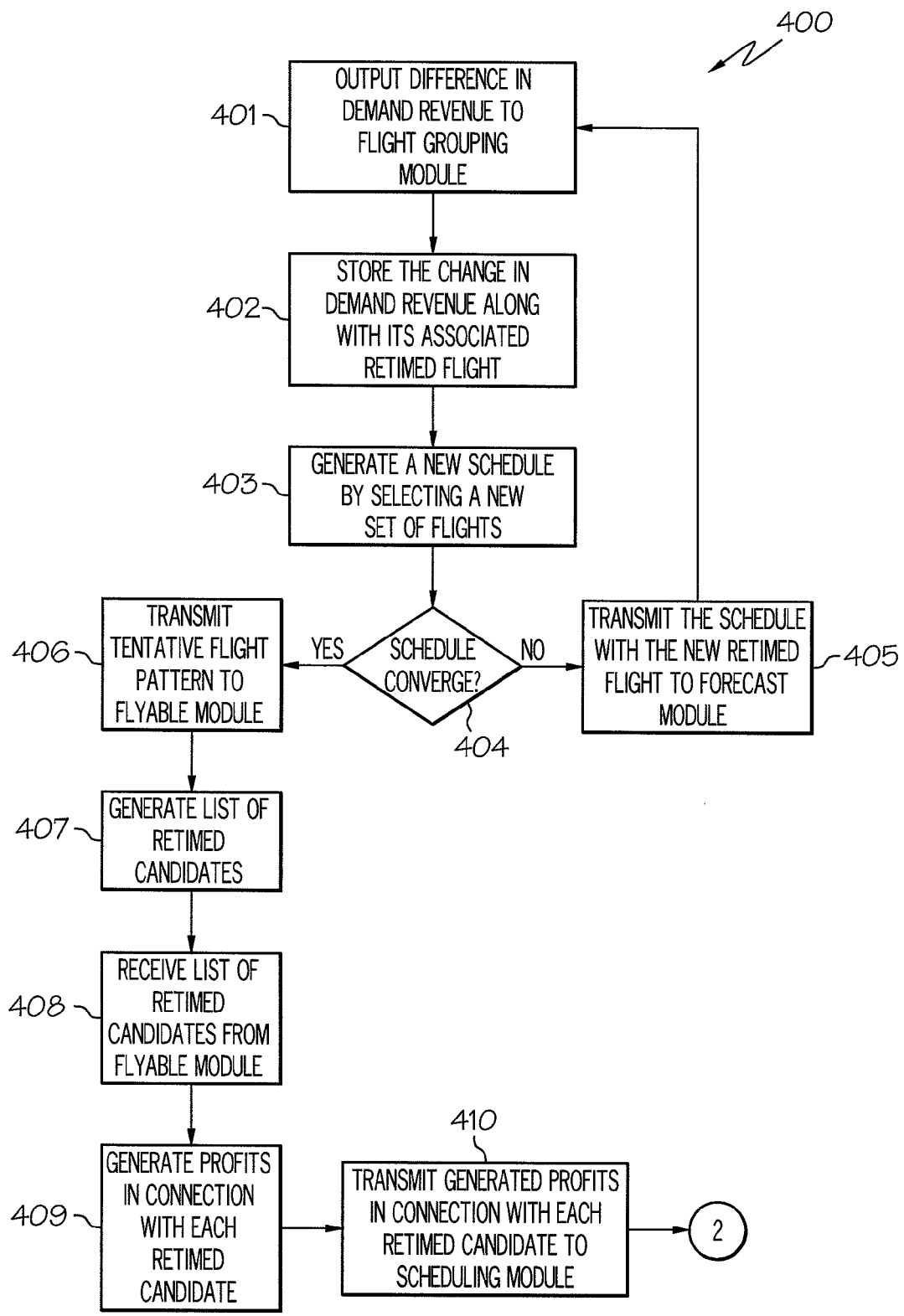
FIGS. 4A-B are a flowchart of a method for producing a schedule that maximizes profit while taking into consideration the feasibility of having such a schedule in accordance with an embodiment of the present invention.
Figure 4B:
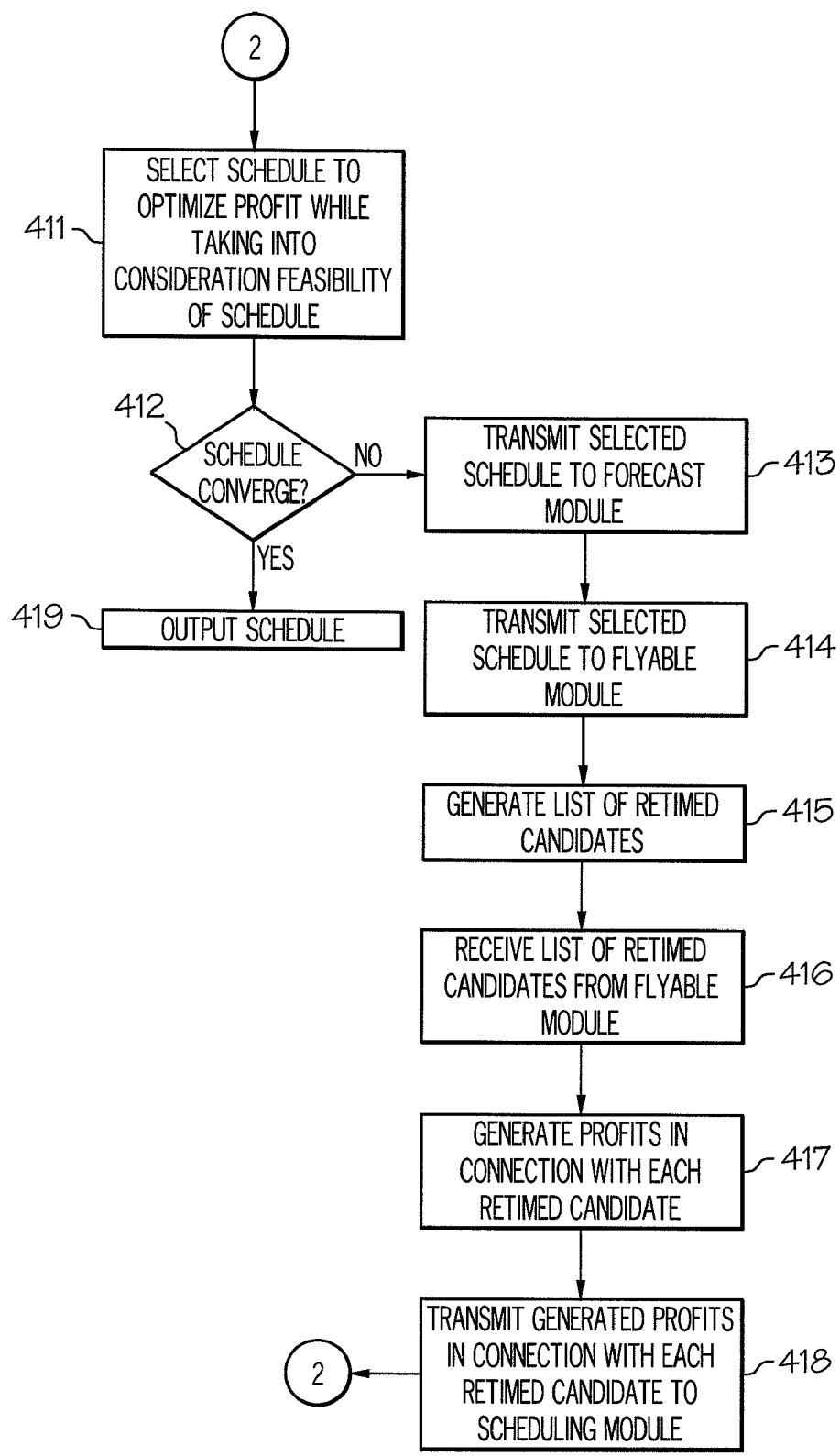

Referring to FIG. 3A, in conjunction with FIGS. 1-2, in step 301, forecast module 201 receives a flight schedule for the airline in question as well as for the other airlines. In one embodiment, forecast module 201 receives such information from a scheduling system. In order to predict the revenue impact on retimed flights, it may be necessary to include the schedule of competitors as the schedule of competitors may affect the anticipated revenue to be earned by the airline. For example, a potential passenger may book a flight on a competing airline if the competitor's flight time is satisfactory and the retimed flight time is unsatisfactory.

In step 302, forecast module 201 receives the origin-destination itineraries, passengers' demand values, observed values and fares. In one embodiment, forecast module 201 receives such information from an airline forecasting system. Origin-destination itinerary may refer to the place of origin and the place of destination of a passenger's itinerary. For example, a passenger may take a flight from San Diego to Austin with a connecting flight in Dallas. The origin-destination itinerary would include the times of each of the flight segments (San Diego to Dallas and Dallas to Austin). Further, forecast module 201 may receive the fare for the trip. Additionally, forecast module 201 receives the passengers' demand values for each origin-destination itinerary. A passenger demand value may refer to a value that is associated with the passenger's desire in taking a particular itinerary at that particular time. Further, forecast module 201 receives what is referred to herein as the "observed value" for each flight. The observed value refers to an estimate of the actual number of passengers who will take that flight. For example, there may be a demand of an equivalent number of 120 people to fly a particular flight segment. However, there are only enough seats to seat 100 people. Hence, in this example, the observed value is 100.

In step 303, forecast module 201 receives the cut-off thresholds of origin-destination itineraries in each origin-destination market. In one embodiment, forecast module 201 receives such information from an airline forecasting system. A cut-off threshold, as used herein, may refer to the cut-off in including an origin-destination itinerary into consideration. Suppose that there are two itineraries serving between Austin and Boston, using Dallas/Fort Worth as a connecting point. If both itineraries have very similar departure times at Austin, but one of these itineraries has a ground time much longer than the other at Dallas/Fort Worth, then the itinerary with a shorter ground time at Dallas/Fort Worth would presumably be more attractive to the traveler between Austin and Boston. The cut-off threshold defines under what conditions one itinerary will be dominated by others and is therefore not worthwhile to consider.

In step 304, forecast module 201 receives a new departure time and arrival time for a flight. That is, forecast module 201 receives a new flight time for a flight ("retimed flight"). In one embodiment, forecast module 201 receives the retimed flight from a user of computer system 100. In another embodiment, forecast module 201 receives the retimed flight from flight grouping module 202.

In step 305, forecast module 201 receives a set of stations (i.e., airports) to consider new passenger connections. For example, by retiming a flight, a set of new connection opportunities may be generated. For a typical "hub and spoke" airline, passenger connections mainly occur at designated airports called "hubs" or "focus" cities. Defining this set of airports in step 305 allows the user to control the time spent in finding new passenger connection opportunities due to the re-timing, thereby saving unnecessary computation time.

In step 306, forecast module 201 determines a set of existing origin-destination itineraries that can still be served by the retimed flight. In step 307, forecast module 201 determines a set of existing origin-destination itineraries that can no longer be served by the retimed flight. For example, suppose that the flight from Dallas to Austin originally left Dallas at 13:00 and was retimed to leave Dallas at 12:40. If a flight from San Diego to Dallas arrives in Dallas at 12:30, then those passengers no longer could make the connecting flight to Austin in Dallas at 12:40. Hence, the origin-destination itinerary from San Diego to Austin with a connecting flight in Dallas at the original time of 13:00 could no longer be served.

Figure 3B:
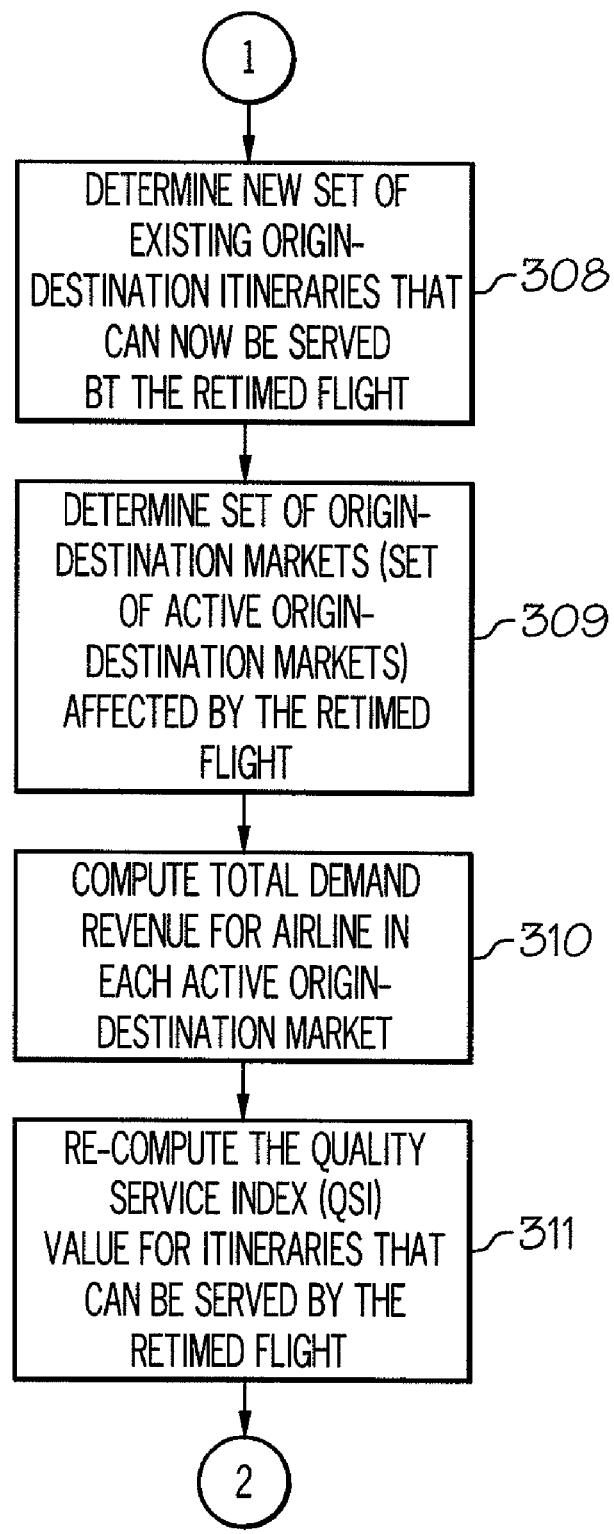

Referring to FIG. 3B, in connection with FIGS. 1-2, in step 308, forecast module 201 determines a new set of existing origin-destination itineraries that can now be served by the retimed flight. For example, if a flight from Dallas to Austin originally left Dallas at 13:00 and was retimed to leave Dallas at 13:20, then there may be new opportunities gained by allowing additional flights to connect in Dallas to fly to Austin. For instance, if a flight from San Diego to Dallas arrived in Dallas at 12:45, then those passengers would not originally be able to make a connecting flight to Austin in Dallas at 13:00. If, however, the flight from Dallas to Austin was retimed to leave Dallas at 13:20, then those passengers on the flight from San Diego to Dallas would now be able to make the connecting flight to Austin in Dallas. The origin-destination itinerary from San Diego to Austin with a connecting flight in Dallas at 13:20 can now be served.

In step 309, forecast module 201 determines the set of origin-destination markets (referred to herein as the "set of active origin-destination markets") affected by the retime flight. For example, the set of active origin-destination markets (e.g., San Diego-Austin market) includes the markets involving new origin-destination itineraries that can now be served by the retimed flight as well as those origin-destination itineraries that can no longer be served.

In step 310, forecast module 201 computes the total demand revenue for the airline in each active origin-destination market. The total demand revenue may refer to the total anticipated revenue to be earned by the airline in each active origin-destination market based on the passengers' demands, observed values and fares. The total demand revenue computed in step 310 is the total demand revenue prior to retiming the flight.

In step 311, forecast module 201 re-computes the Quality Service Index (QSI) value for itineraries that can be served by the retimed flight. The QSI value may refer to a value that is proportional to the quality of service of a flight from the passenger's perspective. The higher the QSI value, the greater the quality of service from the passenger's perspective. For example, a passenger that has to wait for two hours for a connecting flight is going to be less pleased with his/her flight experience (hence have a lower QSI value) than a passenger that only waits a half hour for the connecting flight (have a higher QSI value). For each re-computed QSI value, forecast module 201 performs steps 312-314 as discussed below.

Upon receiving the information described above from the existing airline forecasting system, and by assuming that flights are retimed one at a time, computing the new QSI value for each itinerary in the system may be done efficiently by ignoring secondary effects on the quality of service due to re-timing a flight. In other words, the new QSI value for each itinerary in the system may be computed by focusing on the primary impacts on the QSI of the itinerary if one flight in the itinerary is retimed. Attributes that may contribute to the primary impacts on QSI include, but are not limited to, time-of-day departure and total elapse time of the itinerary. Attributes that contribute to "secondary impacts," include, but are not limited to, airport and route presence. By ignoring these secondary impacts, the new QSI can be computed quickly by using a ratio comparison. Moreover, since flights are assumed to be retimed one at a time, the impact on QSI for each retimed flight can be computed in parallel, i.e., simultaneously. Thus, forecast module 201 is able to handle a large number of retimed flights efficiently. By designing forecast module 201 in this manner, massive computations of the economic impact of many retimed flights may be performed using the same principle as the existing airline forecast system, but without the computation burden associated with using the latter. Hence, there is now the possibility of analyzing a computational intractable number of combinations of retimed flights in order to find a schedule that sustains the best profit.

Figure 3C:
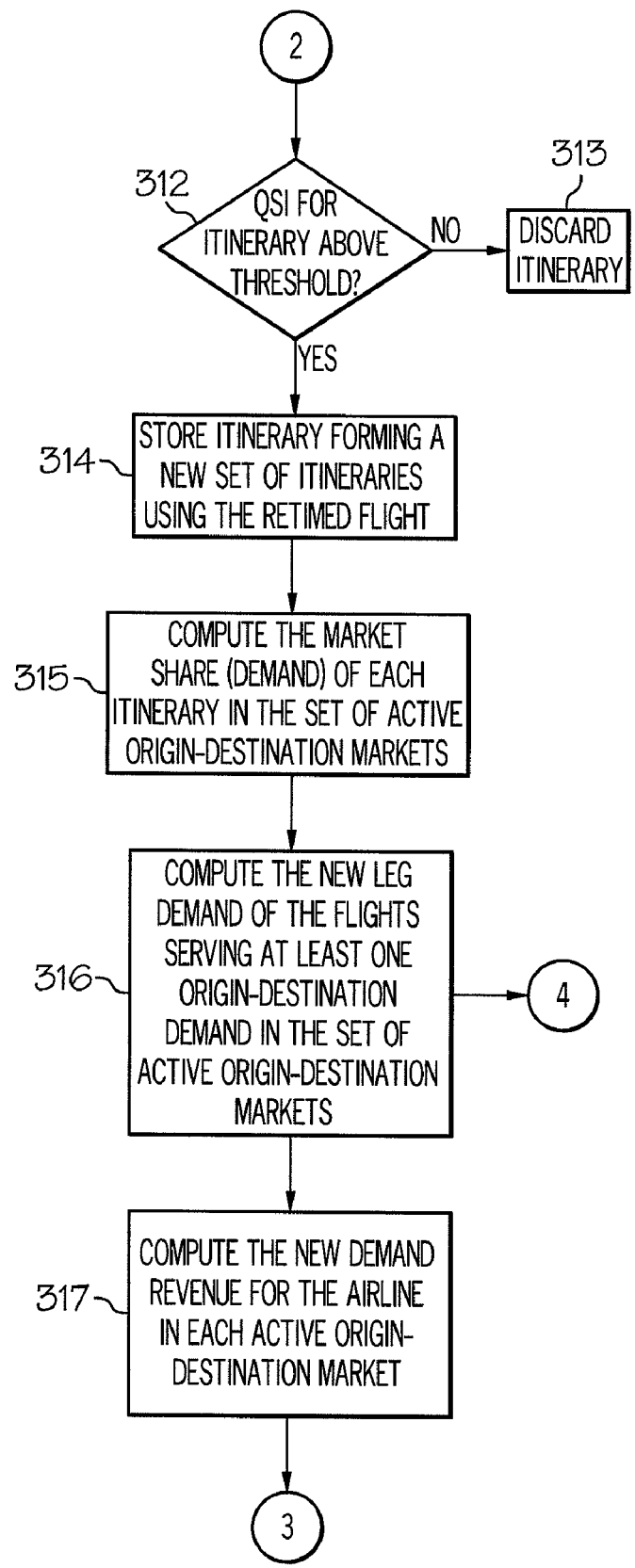

Referring to FIG. 3C, in step 312, forecast module 201 determines whether the re-computed QSI value is above the threshold received in step 303. If the QSI value is below the threshold, that itinerary may be discarded as it is dominated by other itineraries that provide better service to travelers.

If the re-computed QSI value is not above a threshold (i.e., the re-computed QSI value is below the threshold), then, in step 313, the itinerary is discarded.

If, however, the computed QSI value is above the threshold, then, in step 314, the itinerary is stored (e.g., stored in disk unit 108) forming a new set of itineraries using the retimed flight.

In step 315, forecast module 201 computes the market share (demand) of each itinerary in the set of active origin-destination markets. In one embodiment, the market share may be determined based on the QSI values for each of the flights. As discussed above, the QSI value is a reflection on how many passengers are demanding to take such a flight. The QSI values for the airline in question may be compared with the QSI values for the other airlines thereby determining a market share or percentage of the total market for that particular flight.

In step 316, forecast module 201 computes the new leg demand of the flights serving at least one origin-destination demand in the set of active origin-destination markets. A "leg" may refer to the flight segment of the itinerary. For example, the trip from San Diego to Austin with a connecting flight in Dallas may include the leg of San Diego to Dallas and the leg of Dallas to Austin. In computing the leg demand of the flights serving at least one origin-destination demand in the set of active origin-destination markets, forecast module 201 sums up all the origin-destination itineraries that use that flight.

In step 317, forecast module 201 computes the new demand revenue for the airline in each active origin-destination market after the retiming of the flight. As discussed above, the total demand revenue may refer to the total anticipated revenue to be earned by the airline in each active origin-destination market based on the passengers' demands, observed values and fares. The total demand revenue computed in step 317 is the total demand revenue after the retiming of the flight.

Figure 3D:
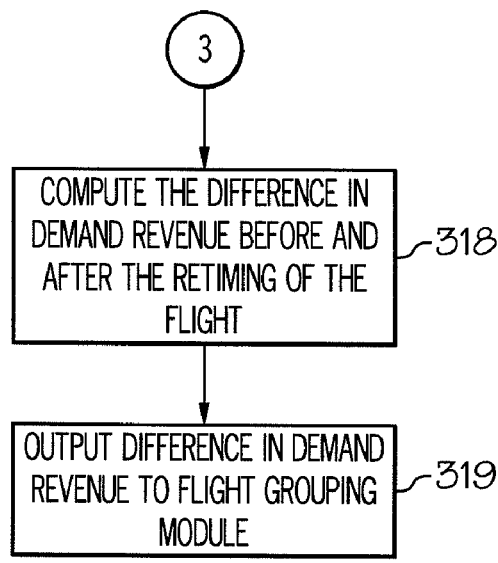

Referring to FIG. 3D, in connection with FIGS. 1-2, in step 318, forecast module 201 computes the difference between the demand revenue prior to retiming of the flight and after the retiming of the flight. That is, forecast module 201 computes the difference between the demand revenue computed in step 310 and the demand revenue computed in step 317. This value may be considered as the impact to the airline as a whole when the flight is retimed.

In step 319, forecast module 201 outputs the difference in demand revenue to flight grouping module 202. A discussion of flight grouping module 202 using the difference in demand revenue to generate a new schedule is provided further below in connection with FIG. 4.

Figure 3E:
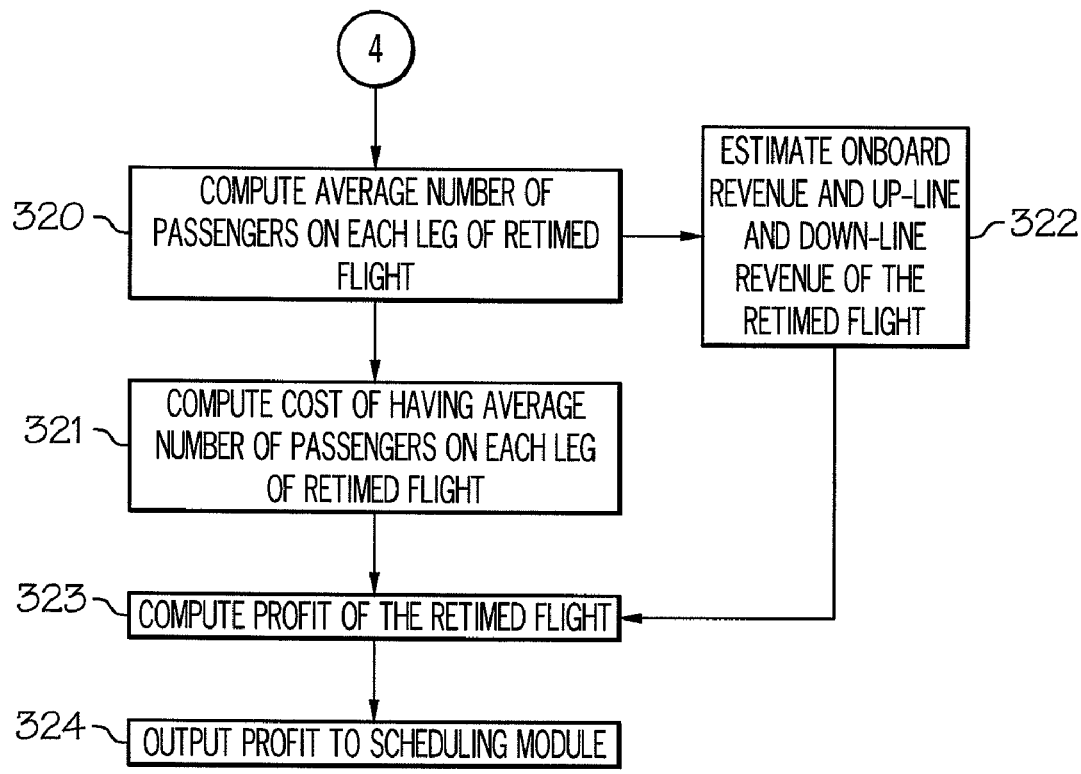

Referring to step 316 of FIG. 3C, forecast module 201 computes the new leg demand of the flights serving at least one origin-destination demand in the set of active origin-destination markets. Referring to FIG. 3E, in connection with FIGS. 1-2, upon forecast module 201 computing the new leg demand of the flights serving at least one origin-destination demand in the set of active origin-destination markets, in step 320, forecast module 201 computes the average number of passengers on each leg of the retimed flight. For example, the demand (referring to the number of passengers who desire to fly this particular flight) for a particular flight may vary from day to day. The average demand may refer to the average number of passengers who desire to fly this particular flight on a given day. For example, there may be a range of 80 to 120 passengers who have a desire to fly that flight on a given day.

The average demand may then be 100. However, if the airplane for that flight has a capacity of 100 passengers, then there will be days in which some of the passengers will not be able to fly that flight. The "average number of passengers on each leg of the retimed flight" refers to the actual number of passengers that can get on board that flight. For example, the average number of passengers on each leg of the retimed flight may be 90 in this example as some days the flight will be filled to capacity (100) and other days it will not be filled to capacity (80).

In step 321, forecast module 201 computes the cost of having the computed number of passengers on each leg of the retimed flight (calculated in step 320). For example, the number of passengers on a flight may have an affect on the cost of fuel as well as the cost in baggage handling.

Referring to step 320, after forecast module 201 computes the average number of passengers on each leg of the retimed flight, forecast module 201, in step 322, estimates the onboard revenue and up-line and down-line revenue of the retimed flight. For example, if a passenger paid $300 for a trip from San Diego to Austin with a connecting flight in Dallas, then the $300 has to be allocated among the following flight segments: San Diego to Dallas and Dallas to Austin. Typically, the fare is distributed among the flight segments, at least in part, based on a function of the distance flown in each flight segment.

Upon estimating the onboard revenue and up-line and down-line revenue of the retimed flight in step 322 and upon computing the cost of having the computed number of passengers on each leg of the retimed flight in step 321, then, in step 323, forecast module 201 computes the profit of the retimed flight. In one embodiment, the profit of the retimed flight may be calculated by subtracting the computed cost of the retimed flight (computed in step 321) from the estimated revenue computed in step 322.

In step 324, forecast module 201 outputs the profit calculated in step 323 to scheduling module 205. A discussion of scheduling module 205 using the profit provided by forecast module 201 to generate a new schedule is provided further below in connection with FIG. 4.

It is noted that method 300 may include other and/or additional steps that, for clarity, are not depicted. Further, method 300 may be executed in a different order presented and that the order presented in the discussion of FIGS. 3A-E is illustrative. Additionally, certain steps in method 300 may be executed in a substantially simultaneous manner or may be omitted.

As discussed above, forecast module 201 outputs the difference in demand revenue to flight grouping module 202 as well as outputs the profit of the retimed flight to scheduling module 205. A discussion of flight grouping module 202 and scheduling module 205 using this information in a manner that produces a schedule that maximizes profit while taking into consideration the feasibility of having such a schedule is discussed below in connection with FIGS. 4A-B.

FIGS. 4A-B—Method for Producing a Schedule that Maximizes Profit

FIGS. 4A-B are a flowchart of a method 400 for producing a schedule that maximizes profit while taking into consideration the feasibility of having such a schedule in accordance with an embodiment of the present invention.

Referring to FIG. 4A, in conjunction with FIGS. 1-2, in step 401 (corresponding to step 319 of FIG. 3D), forecast module 201 outputs the difference in demand revenue for a retimed flight to flight grouping module 202. In step 402, flight grouping module 402 stores the change in demand revenue along with its associated retimed flight. In step 403, flight grouping module 202 generates a new schedule by selecting a new set of flights and a set of flights including some original flights and some retimed flights in attempts of improving the demand revenue.

The methodology for flight grouping module 202 is described below. Flight grouping model 202 generates a new schedule using a linear integer programming model. The objective function of the model can either be maximizing the system demand revenue or maximizing the system profit. The system demand revenue (or system profit) is the sum of the demand revenue impact (or profit) of each retimed flight as computed by forecast module 201. The optimization of the set of flights (combination of original flights and retimed flights) to be selected is subject to a set of linear constraints as discussed below.

One constraint is that one and only one retimed candidate can be selected by the optimizer for each given original flight. That is, even though the original flight may be retimed to numerous departure times over the day, one and only one departure time is selected. Another constraint is that within a given time slot, there is an upper limit to the number of departures flight grouping module 202 can select. This may prevent flight grouping module 202 from selecting departures at the same popular time-of-day, thus ensuring that the airport resource capacity is not exceeded. Another constraint is that all original flights and retimed flights should be either 0 (discarded) or 1 (selected) at the end of the optimization.

Additional constraints may include operational constraints to make the output pattern more flyable. For example, it may be taken into consideration that flights flying from a hub to a small spoke city will turn back immediately to the hub after staying on the ground for a minimum time duration referred to herein as the "exact minimum operation ground time." In this manner, the aircraft is utilized to the maximum extent since the idle time on the ground is at a minimum. In another example, the number of aircraft used in the output is included as an operational constraint. In a further example, flights serving the same non-stop market (e.g., flights from Austin to Dallas) may be separated from one another to ensure they are not too close together (e.g., 30 minutes apart from each other).

In step 404, flight grouping module 202 determines whether the new schedule generated has converged. That is, flight generating module 202 determines whether the new schedule is the same as the previous schedule generated or whether the change in system demand revenue impact (or system profit) is insignificant from the current output versus the previous output.

If the new schedule generated has not converged, then, in step 405, flight grouping module 202 transmits the schedule with the new retimed flights to forecast module 201. Forecast module 201 then calculates and outputs the difference in demand revenue (or profit) for the new retimed flights to flight grouping module 202 in step 401.

If, however, the schedule generated by flight grouping module 202 converges, or the system demand revenue (or profit) change becomes insignificant, then, in step 406, flight grouping module 202 transmits the schedule with the greatest system demand revenue (or system profit) to flyable module 204. That is, when the solution converges, the output from flight grouping module 202 becomes the "tentative flight pattern" 203 and is transmitted to flyable module 204. In one embodiment, flight grouping module 202 saves the schedule associated with each demand revenue received by forecast module 201. Flight grouping module 202 may then select the schedule with the highest demand revenue once the schedules converge as discussed above.

In step 407, flyable module 204 generates a list of retimed candidates based on the received tentative flight pattern 203. Tentative flight pattern 203 may be an un-flyable schedule. That is, the schedule of tentative flight pattern 203 may contain flights that are not flyable. For example, tentative flight pattern 203 may violate some operating constraints. As a result, flyable module 204 generates a list of retimed flights for each original flight in the system so that a combination of some retimed flights and original flights can resolve the operational constraints. That is, flyable module 204 generates a list of retimed flights (e.g., 12:50, 12:55, 13:05, 13:10) for each original flight in the system (e.g., particular flight segment from Dallas to Austin that was schedule to leave at 13:00).

In step 408, forecast module 201 receives a list of the retimed candidates from flyable module 204. In step 409, forecast module 201 generates a profit for each of the retimed flights. In step 410, forecast module 201 transmits the generated profits in connection with each retimed candidate to scheduling module 205.

Referring to FIG. 4B, in conjunction with FIGS. 1-2, in step 411, scheduling module 205 selects a schedule that maximizes the profit based on the feasibility of implementing such a schedule.

In step 412, scheduling module 205 determines whether the selected schedule has converged. That is, scheduling module 205 determines whether the selected schedule is the same as the previous schedule selected or that the change in system profit is insignificant from the previous iteration to the current iteration.

If the iteration process has not converged, then, in step 413, scheduling module 205 transmits the selected schedule to forecast module 201. In step 414, forecast module 201 transmits the received schedule to flyable module 204. In step 415, upon receiving the schedule from forecast module 201, flyable module 204 generates a list of retimed flights for each original flight in the received schedule. Depending on the number of violations in operational constraints, flyable module 204 may generate a new set of retimed candidates or may reuse the old set of retimed candidates. In step 416, forecast module 201 receives a list of the retimed candidates from flyable module 204. In step 417, forecast module 201 generates a profit for each of the retimed flights. In step 418, forecast module 201 transmits the generated profits in connection with each retimed candidate to scheduling module 205. Upon forecast module 201 transmitting the generated profits, scheduling module 205 selects a schedule that maximizes the profit based on the feasibility of implementing such a schedule in step 411.

Returning to step 412, if the selected schedule does converge, then, in step 419, scheduling module 205 outputs the selected schedule which corresponds to the schedule to be implemented by the airline. The outputted schedule corresponds to the schedule that maximizes profit while taking into consideration operational constraints.

Method 400 may include other and/or additional steps that, for clarity, are not depicted. Further, method 400 may be executed in a different order presented and that the order presented in the discussion of FIGS. 4A-B is illustrative. Additionally, certain steps in method 400 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for quantifying the revenue and profit impact of retiming flights, the method comprising the steps of:
   receiving a flight schedule for a plurality of airlines;
   receiving a new departure time and a new arrival time for a retimed flight;
   determining a set of existing origin-destination itineraries that can still be served by said retimed flight;
   determining a set of existing origin-destination itineraries that can no longer be served by said retimed flight;
   determining a set of new origin-destination itineraries that can now be served by said retimed flight;
   computing, by a processor, a total demand revenue in each active origin-destination market without said retimed flight, wherein said active origin-destination market corresponds to said set of existing origin-destination itineraries that can still be served by said retimed flight, said set of existing origin-destination itineraries that cannot be served by said retimed flight, and said set of new origin-destination itineraries that can now be served by said retimed flight;
   computing a quality of service value for itineraries that can be served by said retimed flight, wherein said quality of service value corresponds to a value proportional to a quality of service of a flight;
   discarding itineraries corresponding to quality of service values below a threshold;
   storing itineraries corresponding to quality of service values above said threshold, wherein said stored itineraries form a new set of origin-destination itineraries using said retimed flight;
   computing a total demand revenue using said new set of origin-destination itineraries using said retimed flight; and
   computing, by a processor, a difference between said computed total demand revenue in each active origin-destination market without said retimed flight and said computed total demand revenue using said new set of origin-destination itineraries using said retimed flight.

2. The method as recited in claim 1 further comprising the steps of:
   receiving origin-destination itineraries, passengers' demand values, observed values and fares;
   receiving a cut-off threshold for said received origin-destination itineraries.

3. The method as recited in claim 1 further comprising the steps of:
   outputting said difference in total demand revenue to a first module configured to generate a second retimed flight;
   receiving a transmitted schedule with said second retimed flight; and
   generating a change in demand revenue in connection with said first and said second retimed flight.

4. The method as recited in claim 3 further comprising the steps of:
   converging to a first schedule with a greatest demand revenue; and
   generating a first set of retimed candidates based on said converged first schedule.

5. The method as recited in claim 4 further comprising the steps of:
   generating a profit for each of said first set of retimed candidates; and transmitting said profit for each of said first set of retimed candidates to a scheduling module.

6. The method as recited in claim 5 further comprising the step of:
selecting a second schedule that maximizes profit based on a feasibility of implementing said second schedule.

7. The method as recited in claim 6 further comprising the steps of:
receiving said selected second schedule; and
generating a profit for each of a second set of retimed candidates based on said selected second schedule.

8. The method as recited in claim 7 further comprising the step of:
converging to a third schedule that maximizes profit while taking into consideration operational constraints.

9. A system, comprising:
a memory unit for storing a computer program for quantifying the revenue and profit impact of retiming flights; and
a processor coupled to said memory unit, wherein said processor, responsive to said computer program, comprises:
circuitry for receiving a flight schedule for a plurality of airlines;
circuitry for receiving a new departure time and a new arrival time for a retimed flight;
circuitry for determining a set of existing origin-destination itineraries that can still be served by said retimed flight;
circuitry for determining a set of existing origin-destination itineraries that can no longer be served by said retimed flight;
circuitry for determining a set of new origin-destination itineraries that can now be served by said retimed flight;
circuitry for computing a total demand revenue in each active origin-destination market without said retimed flight, wherein said active origin-destination market corresponds to said set of existing origin-destination itineraries that can still be served by said retimed flight, said set of existing origin-destination itineraries that cannot be served by said retimed flight, and said set of new origin-destination itineraries that can now be served by said retimed flight;
circuitry for computing a quality of service value for itineraries that can be served by said retimed flight, wherein said quality of service value corresponds to a value proportional to a quality of service of a flight;
circuitry for discarding itineraries corresponding to quality of service values below a threshold;
circuitry for storing itineraries corresponding to quality of service values above said threshold, wherein said stored itineraries form a new set of origin-destination itineraries using said retimed flight;
circuitry for computing a total demand revenue using said new set of origin-destination itineraries using said retimed flight; and
circuitry for computing a difference between said computed total demand revenue in each active origin-destination market without said retimed flight and said computed total demand revenue using said new set of origin-destination itineraries using said retimed flight.

10. The system as recited in claim 9, wherein said processor further comprises:
circuitry for receiving origin-destination itineraries, passengers' demand values, observed values and fares;
circuitry for receiving a cut-off threshold for said received origin-destination itineraries.

11. The system as recited in claim 9, wherein said processor further comprises:
circuitry for outputting said difference in total demand revenue to a first module configured to generate a second retimed flight; and
circuitry for receiving a transmitted schedule with said second retimed flight; and
circuitry for generating a change in demand revenue in connection with said first and said second retimed flight.

12. The system as recited in claim 11, wherein said first module generates a converged first schedule with a greatest demand schedule, wherein a second module generates a first set of retimed candidates based on said converged first schedule.

13. The system as recited in claim 12, wherein said processor further comprises:
circuitry for generating a profit for each of said first set of retimed candidates; and
circuitry for transmitting said profit for each of said first set of retimed candidates to a scheduling module.

14. The system as recited in claim 13, wherein said scheduling module selects a second schedule that maximizes profit based on a feasibility of implementing said second schedule.

15. The system as recited in claim 14, wherein said processor further comprises:
circuitry for receiving said selected second schedule; and
circuitry for generating a profit for each of a second set of retimed candidates based on said selected second schedule.

16. The system as recited in claim 15, wherein said scheduling module generates a converged third schedule that maximizes profit while taking into consideration operational constraints.

17. A computer program product embodied in a computer readable storage medium for quantifying the revenue and profit impact of retiming flights, the computer program product comprising the programming steps of:
receiving a flight schedule for a plurality of airlines;
receiving a new departure time and a new arrival time for a retimed flight;
determining a set of existing origin-destination itineraries that can still be served by said retimed flight;
determining a set of existing origin-destination itineraries that can no longer be served by said retimed flight;
determining a set of new origin-destination itineraries that can now be served by said retimed flight;
computing a total demand revenue in each active origin-destination market without said retimed flight, wherein said active origin-destination market corresponds to said set of existing origin-destination itineraries that can still be served by said retimed flight, said set of existing origin-destination itineraries that cannot be served by said retimed flight, and said set of new origin-destination itineraries that can now be served by said retimed flight;
computing a quality of service value for itineraries that can be served by said retimed flight, wherein said quality of service value corresponds to a value proportional to a quality of service of a flight;
discarding itineraries corresponding to quality of service values below a threshold;
storing itineraries corresponding to quality of service values above said threshold, wherein said stored itineraries form a new set of origin-destination itineraries using said retimed flight;

computing a total demand revenue using said new set of origin-destination itineraries using said retimed flight; and computing a difference between said computed total demand revenue in each active origin-destination market without said retimed flight and said computed total demand revenue using said new set of origin-destination itineraries using said retimed flight.

18. The computer program product as recited in claim 17 further comprising the programming steps of:

receiving origin-destination itineraries, passengers' demand values, observed values and fares;

receiving a cut-off threshold for said received origin-destination itineraries.

19. The computer program product as recited in claim 17 further comprising the programming steps of:

outputting said difference in total demand revenue to a first module configured to generate a second retimed flight; and receiving a transmitted schedule with said second retimed flight; and generating a change in demand revenue in connection with said first and said second retimed flight.

20. The computer program product as recited in claim 19, wherein said first module generates a converged first schedule with a greatest demand schedule, wherein a second module generates a first set of retimed candidates based on said converged first schedule.

21. The computer program product as recited in claim 20 further comprising the programming steps of:

generating a profit for each of said first set of retimed candidates; and transmitting said profit for each of said first set of retimed candidates to a scheduling module.

22. The computer program product as recited in claim 21, wherein said scheduling module selects a second schedule that maximizes profit based on a feasibility of implementing said second schedule.

23. The computer program product as recited in claim 22 further comprising the programming steps of:

receiving said selected second schedule; and generating a profit for each of a second set of retimed candidates based on said selected second schedule.

24. The computer program product as recited in claim 23, wherein said scheduling module generates a converged third schedule that maximizes profit while taking into consideration operational constraints.

* * * * *